United States Patent
Sipher et al.

(10) Patent No.: US 9,445,230 B1
(45) Date of Patent: Sep. 13, 2016

(54) AUTOMATED ARRIVAL NOTIFICATIONS

(71) Applicant: Pinger, Inc., San Jose, CA (US)

(72) Inventors: Joseph Sipher, Sunnyvale, CA (US); Anjini Shukla, Mountain View, CA (US); Derek Rodrigues, Ojai, CA (US); Silvia Cret, Cluj-Napoca (RO)

(73) Assignee: Pinger, Inc., San Jose, CA (US)

( * ) Notice: Subject to any disclaimer, the term of this patent is extended or adjusted under 35 U.S.C. 154(b) by 194 days.

(21) Appl. No.: 14/228,008

(22) Filed: Mar. 27, 2014

(51) Int. Cl.
*H04W 24/00* (2009.01)
*H04W 4/02* (2009.01)

(52) U.S. Cl.
CPC .................................. *H04W 4/021* (2013.01)

(58) Field of Classification Search
CPC ..... H04W 4/02; H04W 64/00; H04W 48/04; H04L 29/08108; H04L 2012/5607
USPC ......... 455/414.1, 414.2, 456.1, 0.2, 0.3, 0.4, 455/0.5, 0.6, 457; 370/310.2
See application file for complete search history.

(56) References Cited

U.S. PATENT DOCUMENTS

| | | | | | |
|---|---|---|---|---|---|
| 5,541,845 | A | * | 7/1996 | Klein | G08G 1/137 340/988 |
| 5,717,389 | A | * | 2/1998 | Mertens | G07B 15/063 235/384 |
| 5,963,948 | A | * | 10/1999 | Shilcrat | G06F 17/30855 340/995.19 |
| 6,124,810 | A | * | 9/2000 | Segal | G08G 1/20 340/441 |
| 7,013,151 | B2 | * | 3/2006 | Hirokawa | G01C 21/20 455/456.1 |
| 9,111,403 | B2 | * | 8/2015 | Westerlage | G07C 5/008 |
| 9,247,377 | B2 | * | 1/2016 | Pai | H04W 4/02 |
| 2003/0004747 | A1 | * | 1/2003 | Burton | G05D 1/0278 705/338 |
| 2008/0312946 | A1 | * | 12/2008 | Valentine | G06Q 20/382 705/64 |
| 2009/0170528 | A1 | * | 7/2009 | Bull | H04W 48/04 455/456.2 |
| 2010/0127919 | A1 | * | 5/2010 | Curran | G01S 19/40 340/573.4 |
| 2011/0142016 | A1 | * | 6/2011 | Chatterjee | G06Q 30/02 370/338 |

OTHER PUBLICATIONS

Glympse, "About Us: Glympse", pp. 1-3, (retrieved on Jun. 10, 2014 from https://www.glympse.com/about).

* cited by examiner

*Primary Examiner* — Steve D Agosta
(74) *Attorney, Agent, or Firm* — Raubvogel Law Office

(57) ABSTRACT

A device's arrival at a destination location is automatically detected, and notification of such arrival is automatically generated, without any need for a user to specify the destination location in advance. A perimeter, or geofence, is continually or periodically defined around the device's current location. A timer is automatically set, with some pre-specified duration. If the device exits the geofence before the timer expires, the new location of the device is determined, a new geofence around that location is defined, and the timer is reset. If the timer expires before the device exits the geofence, the device is considered to have arrived at a destination; an "arrives" event is generated. Notification of such an event can be output at the device and/or transmitted to one or more subscribers. Various exceptions, conditions, and preferences can be taken into account so as to avoid false positives.

38 Claims, 9 Drawing Sheets

AUTOMATED ARRIVAL NOTIFICATIONS

FIELD OF THE INVENTION

The present invention relates to automatically generating notifications that a person or entity has arrived at a location, and more particularly to a system and method for generating such notifications without pre-selecting an arrival point.

DESCRIPTION OF THE RELATED ART

Many mobile devices, such as smartphones, are able to determine their location via built-in GPS tracking components and/or other means. Such devices are also able to generate a notification when a person carrying such a device has arrived at some pre-defined location. The user can specify a destination, and the mobile device alerts the user, for example by beeping or vibrating, when the user has arrived at the destination. This can be useful, for example, to avoid missing a stop on a train or bus. Two examples of applications, or "apps", for performing such functions are LocationAlarm and iNap.

Another use for such functionality is so that parents, spouses, and the like, can be informed when their loved ones arrive at a location. The parent or spouse specifies a destination location, such as a friend's house, school, restaurant, movie theater, or the like; when the person carrying the device arrives at the specified destination, the device transmits a notification to the parent or spouse's device, which then issues an alert or message informing the parent or spouse that the device holder has arrived. Examples of apps that perform such functionality are Twist and Glympse.

In general, such systems require the user to specify the destination location in advance, so that the device can compare its current location with the destination location and thereby determine whether the device holder has arrived. This requirement can be burdensome, and can prevent or inhibit effective use of arrival notification technology, as it often requires typing in an address or searching for a location before the destination can be specified. Also, such a requirement means that such systems cannot effectively provide arrival alerts if the destination location is not known in advance.

SUMMARY

In various embodiments, the system and method of the present invention provide techniques for automatically detecting arrival at a destination location, and generating a notification of such arrival, without any need for a user to specify the destination location in advance. Rather, the system and method of the present invention automatically determine that the device holder has arrived at a location likely to be a destination.

In at least one embodiment, the system and method of the present invention operate as follows: A perimeter, or geofence, is continually or periodically (and automatically) defined around the device's current location. A timer is automatically set, with some pre-specified duration.

If the device exits the geofence before the timer expires, the new location of the device is determined, a new geofence around that location is defined, and the timer is reset.

If, however, the timer expires before the device exits the geofence, the device (and its holder) is considered to have arrived at a destination. In various embodiments, depending on the application and/or other factors, various exceptions, preferences, and conditions can be taken into account so as to avoid false positives.

Once it is determined that the device has arrived at a destination, an "arrives" event is determined to have taken place. Any suitable form of notification or alert can be issued in connection with this event, for example by causing the device to beep or vibrate.

In addition to or instead of the local alert, the device can automatically transmit a message to one or more subscribers (such as parents or spouse) to inform the subscriber(s) that the device holder has arrived at the destination. The message can be sent by any suitable means, such a push notification, email, text (SMS), and/or the like. The message can contain any desired information, such as the time of arrival, the current location of the device holder, the geofence parameters, and/or the like. The subscriber can also be automatically notified when the device holder leaves the destination, or leaves a defined geofence surrounding the destination.

Further variations are possible, such as those described herein. The techniques of the present invention can be used for tracking locations of packages, cargo, shipping containers, vehicles, and/or other entities, and are not limited to tracking of individuals carrying smartphones.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

For illustrative purposes, the systems and methods described and depicted herein may refer to mechanisms for tracking locations of a mobile device being carried by a human being; this human being is referred to herein as a "device holder". However, the techniques of the present invention can also be applied to tracking of packages, cargo, vehicles, and/or other entities, and are not limited to tracking of human beings carrying smartphones.

In addition, for illustrative purposes, the described system and method send notifications to another entity, referred to as a "subscriber". Such notifications can be sent via any known wired or wireless communications method, whether by text message, email, instant message, voice call, voicemail, update to a website, app, or the like. The method can be push-based or pull-based. Alternatively, the system and method of the present invention can update arrival information for the device holder on a website, allowing any interested person or entity to check the website and review the arrival information. The website can be password-protected or otherwise secured so as to allow access only to authorized persons or entities. In at least one embodiment, the device holder can determine whether or not a particular entity should have access to arrival information and/or be notified of arrival information. In yet another embodiment, the system and method of the present invention do not transmit arrival information, but rather output arrival alerts at the device holder's device only.

Accordingly, one skilled in the art will recognize that the particular steps and architectures described herein are merely exemplary, and that many other arrangements and methods of operation are possible without departing from the essential characteristics of the present invention, as set forth in the claims.

System Architecture

Although the invention is described herein in connection with an implementation in a smartphone, one skilled in the art will recognize that the techniques of the present invention can be implemented in other contexts, and indeed in any suitable device having location detection capability such as GPS functionality. For example, any of the client devices mentioned herein can be a desktop computer, laptop computer, personal digital assistant (PDA), cellular telephone, smartphone, music player, handheld computer, tablet computer, kiosk, game system, vehicle, vehicle component, RFID tag, wristwatch, music player, bracelet, ankle bracelet, surgically implanted device, or the like. The electronic device can be a stand-alone device, such as a smartphone or tablet, or it can be wearable, such as a wristwatch or bracelet, or it can be built into a vehicle or other machine or component.

Accordingly, the following description is intended to illustrate various embodiments of the invention by way of example, rather than to limit the scope of the claimed invention.

Figure 1A:
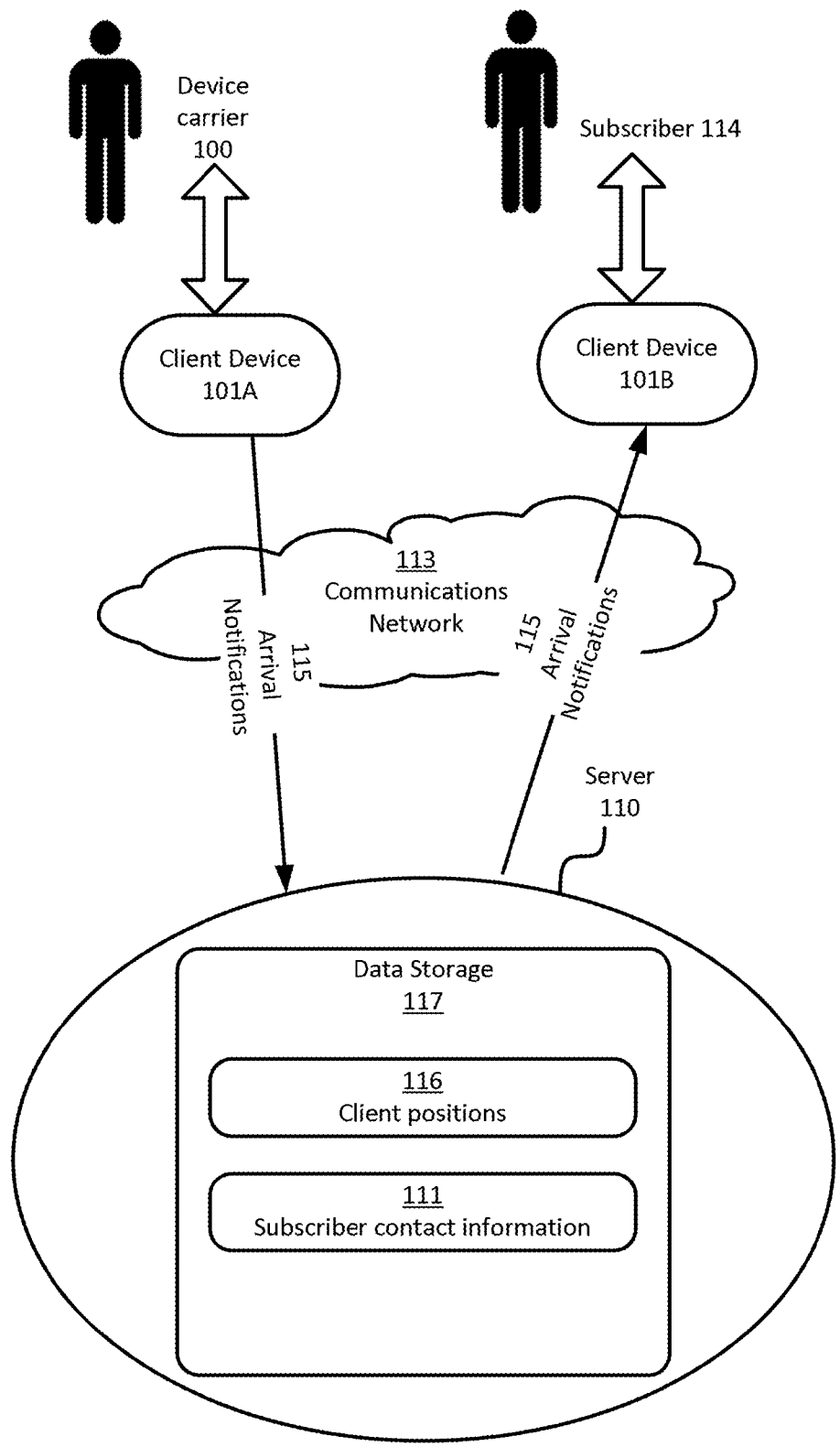
FIG. 1A is a block diagram depicting an overall architecture for practicing the present invention according to one embodiment.

Referring now to FIG. 1A, there is shown a block diagram depicting a hardware architecture for practicing the present invention, according to one embodiment. Such an architecture can be used, for example, for implementing the techniques of the present invention in a system having a client device 101A carried by an individual, human being, animal, item, vehicle, or object whose location is being tracked (referred to herein as the device holder 100). Also included in the architecture depicted in FIG. 1A is client device 101B associated with subscriber 114. Subscriber 114 is an individual or other entity who is interested in the location of device holder 100; the system is configured to send arrival notifications 115 to client device 101B so as to alert subscriber 114 when client device 101A (and therefore device holder 100) has arrived at a location. The term "device holder 100" is used for ease of nomenclature; however, in some embodiments, the individual whose location is being tracked need not physically hold or carry client device 101A; for example, device holder 100 may actually be a driver or passenger in a vehicle containing client device 101A. Alternatively, if subscriber 114 is interested in the location of client device 101A itself, there may not even be a device holder 100. In yet other embodiments, client device 101A may be associated with cargo, a vehicle, or some other object or item, so that there may not be a device holder 100.

Figure 2A:
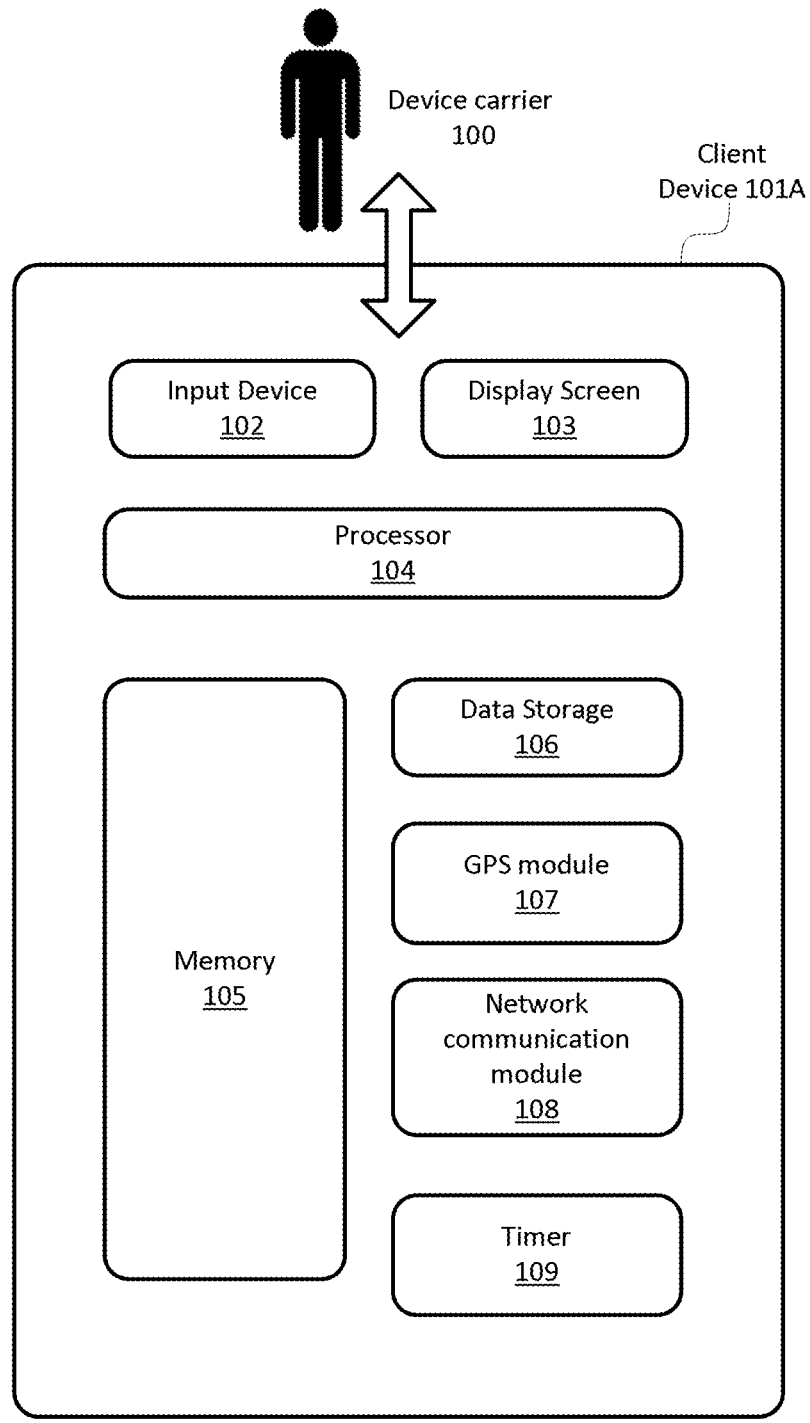
FIG. 2A is a block diagram depicting an architecture for a client device associated with a device holder, according to one embodiment.

In at least one embodiment, client device 101A has a number of hardware components well known to those skilled in the art. Referring now to FIG. 2A, there is shown a block diagram depicting an architecture for client device 101A according to one embodiment. Input device 102 can be any element that receives input from device holder 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Display screen 103 can be any element that graphically displays information to device holder 100, including for example location information, alerts, notifications, and/or the like. Display screen 103 can also display other forms of output, as are known in the art, such as status information, timer information, prompts that request information from the device holder 100, and/or the like.

In at least one embodiment, device 101A includes a touchscreen which can act as both input device 102 and display device 103 according to well-known mechanisms.

In at least one embodiment, other types of output device(s) can be included, such as an audio output device (e.g. a speaker for emitting a sound or announcement upon an arrival or departure event) and/or a haptic output device (e.g., for causing device 101A to vibrate upon an arrival or departure event).

Data storage 106 can be any magnetic, optical, or electronic device for storing data in digital form; examples include flash memory, magnetic hard drive, CD-ROM, DVD-ROM, or the like. Data storage 106 can be used for storing any information needed for implementing the present invention, such as for example, geofence parameters, location information, and the like.

Processor 104 can be a conventional microprocessor for performing operations on data under the direction of software, according to well-known techniques. Memory 105 can be random-access memory, having a structure and architecture as are known in the art, for use by processor 104 in the course of running software.

Network communication module 108 enables communication with a network 113 such as the Internet, a cellular telephone network, and/or the like. For example, network communication module 108 may enable transmission of generated arrival notifications 115 and/or location information to server 110 via network 113. Any suitable type of communications network 113, such as the Internet, can be used as the mechanism for transmitting data among the various components of the present invention, according to any suitable protocols and techniques. In addition to the Internet and cellular telephone networks, other examples include EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof.

GPS module 107 is any device capable of determining the geographic position of device 101A, either in an absolute sense in connection with the surface of the Earth, or in a relative sense as compared with a reference point. Such device may operate according to any of a number of well known mechanisms, such as by communication with GPS satellites, cell tower triangulation, and/or any other suitable technique(s). The inclusion of GPS module 107 in a mobile device such as a smartphone is well known in the art.

Timer 109 can be any electronic and/or mechanical device for measuring time; it may be a countdown timer or an elapsed-time timer. In at least one embodiment, timer 109 may be integrated into processor 104. Timer 109 is used in connection with the method of the present invention, as described below, for example to determine whether device 101A has exited a geofence within a predetermined period of time.

Figure 2B:
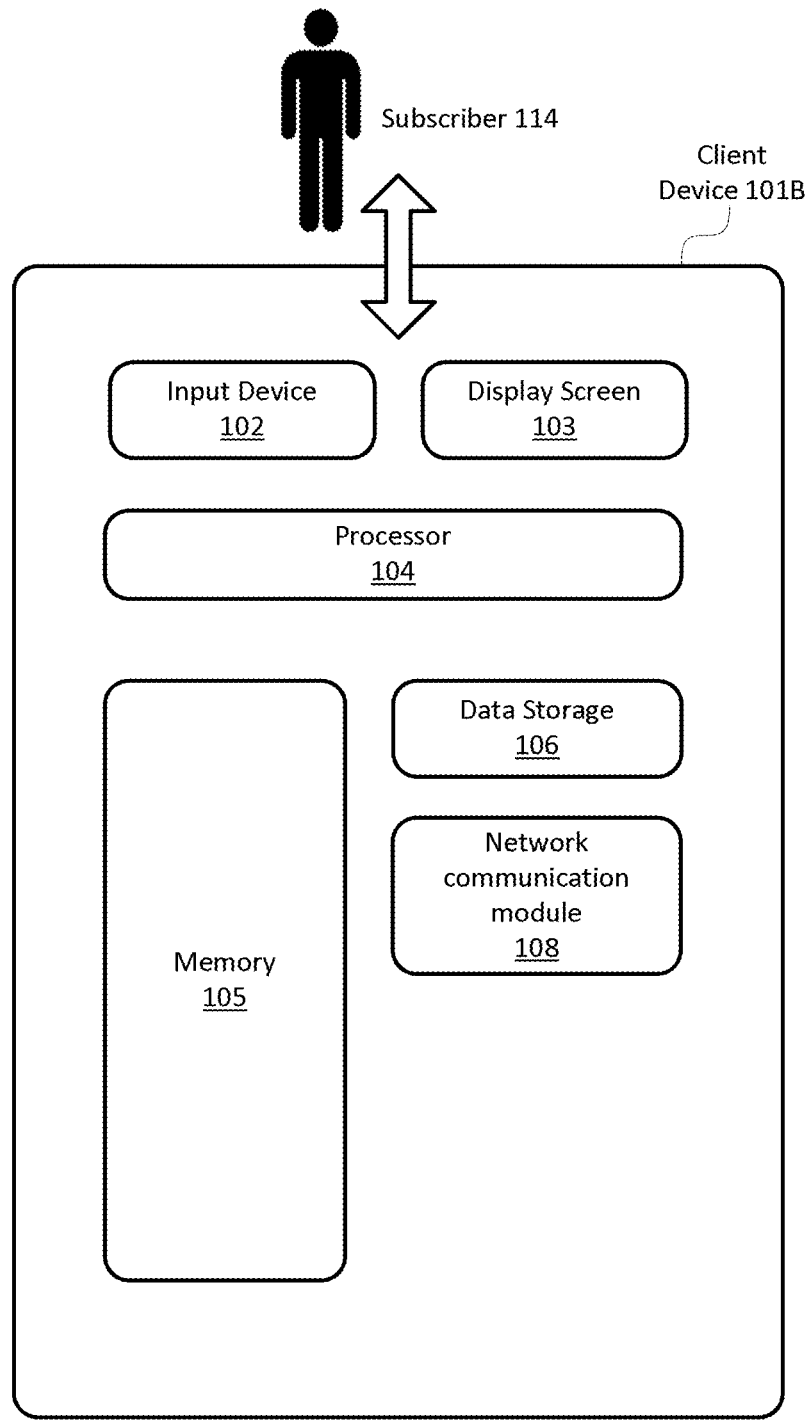
FIG. 2B is a block diagram depicting an architecture for a client device associated with a subscriber, according to one embodiment.

Client device 101B may be any device for displaying alerts or notifications as to arrival events for client device 101A. In at least one embodiment, client device 101E has a number of hardware components well known to those skilled in the art. Referring now to FIG. 2B, there is shown a block diagram depicting an architecture for client device 101E according to one embodiment. Input device 102, display screen 103, processor 104, memory 105, data storage 106, and network communication module 108 are components that may be similar to those of client device 101A as described above. Other components of client device 101A, such as GPS module 107 and timer 109, are omitted from client device 101E because they are not needed in the context of a device associated with subscriber 114 (though such components can still be included, if desired). In one embodiment, client device 101B can be similar or identical to client device 101A (for example, both may be smartphones); alternatively, client device 101E can a different type of device than client device 101A (for example, client device 101A may be a smartphone, while client device 101E may be a desktop computer). In at least one embodiment, arrival notifications can be output at client device 101E as part of a web-based implementation, wherein client device 101E runs a browser that provides a user interface for viewing arrival notifications in connection with device 101A; such arrival notifications can be presented as parts of web pages served by server 110, using known protocols and languages such as Hypertext Markup Language (HTML), Java, JavaScript, and the like. In at least one embodiment, client device 108 transmits requests for data via communications network 113, and receives responses from server 110 containing the requested data. Notifications can be provided at client device 101B using a push-based mechanism or pull-based mechanism.

In at least one embodiment, multiple client devices 101B may be included, for receiving and outputting arrival notifications 115 to multiple subscribers 114. For example, if device holder 100 is a child, both parents may wish to receive arrival alerts in connection with the child; thus both parents may be subscribers 114 whose client devices 101E are configured to receive arrival alerts for the child's client device 101A.

In an alternative embodiment, client device 101B may be omitted altogether, for example if arrival notifications are output at client device 101A itself and/or at server 110.

Referring again to FIG. 1A, server 110 can be any device capable of receiving arrival notifications 115 from client device 101A via network 113. In at least one embodiment, server 110 transmits such notifications 115 via network 113 to client device(s) 101B associated with subscriber(s) 114. In at least one embodiment, server includes data storage 117 for keeping track of client positions 116 and/or subscriber contact information 111. Subscriber contact information 111 may be, for example, a database that indicates which subscribers 114 should receive arrival notifications for which client devices 101A. Data storage 117 may also contain any other suitable information for implementing the present invention.

In at least one embodiment, data stored in data storage 117 may be organized into one or more well-ordered data sets, with one or more data entries in each set. Data storage 117, however, can have any suitable structure. Accordingly, the particular organization of data storage 117 need not resemble the form in which information is provided to client device 101E and/or displayed to subscriber 114.

The distribution of components and functionality among client devices 101A, 101B, and server 110 as depicted in the Figures is merely exemplary. One skilled in the art will recognize that the functionality of the present invention can be distributed in different ways among various hardware and software components.

For example, in at least one embodiment, client device 101A tracks its own location, establishes geofences and timers (as described in more detail below), and generates "arrived" events accordingly. In response to such events, client device 101A transmits notifications via network 113 to server 110 and/or client device 101B.

Figure 1B:
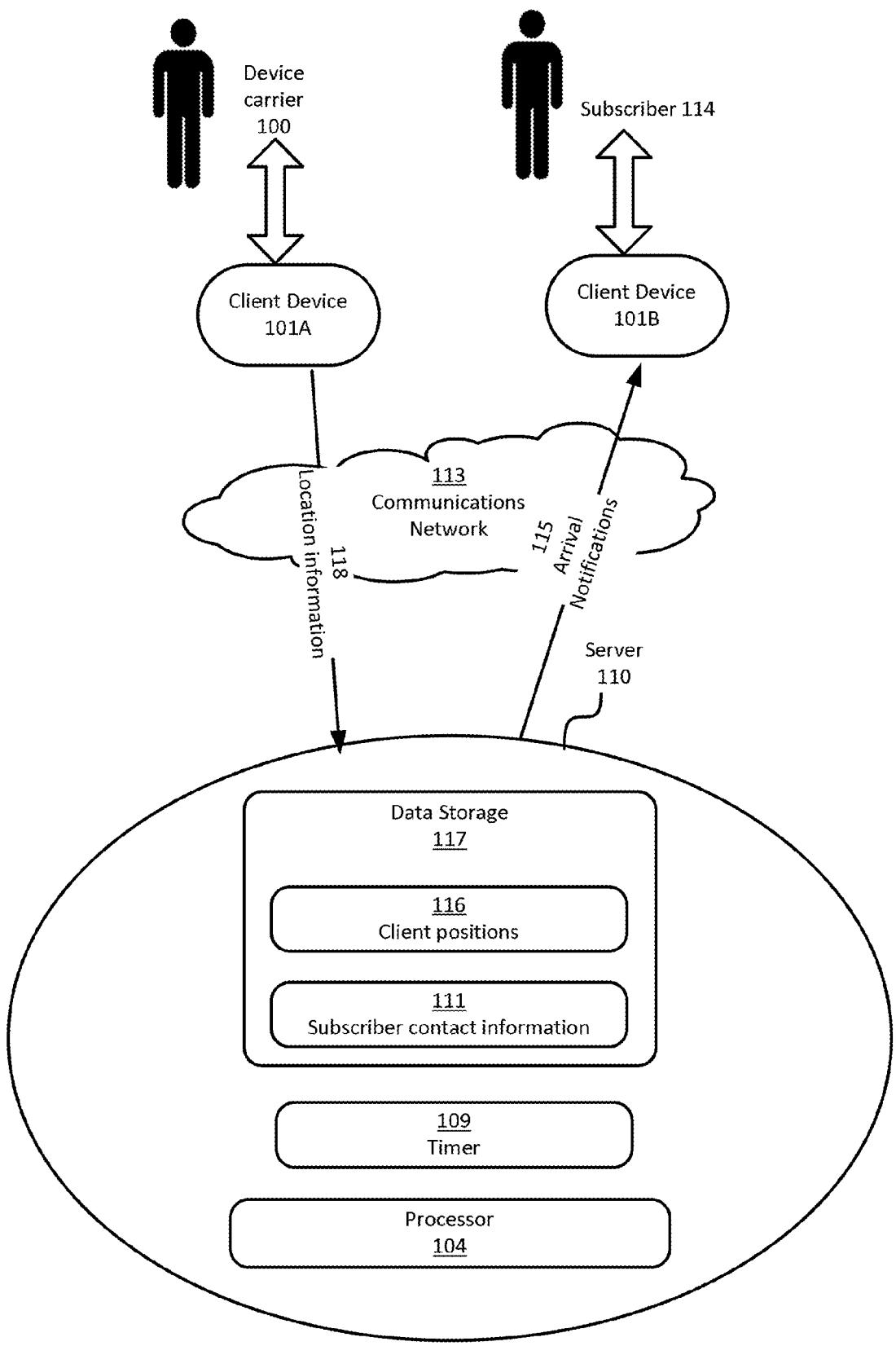
FIG. 1B is a block diagram depicting an overall architecture for practicing the present invention according to another embodiment.

In another embodiment, as depicted in FIG. 1B, client device 101A can transmit location information to server 110, and the geofences and timers can be established at server 110 rather than at client device 101A. In such an embodiment, server 110 generates the "arrived" events based on the location information received from client device 101A. Server 110 may include additional components as needed for retrieving relevant data from data storage 117 in response to requests from client device 101B. Server 110 may also include its own processor 104 for processing received location information 118 and generating arrival notifications 115. In such an embodiment, timer 109 can be included in server 110 and omitted from client device 101A.

In yet another embodiment, the invention can be implemented in a stand-alone device such as client device 101A, without any connection to a network 113, server 110, or other device(s) 101B. In such an embodiment, arrival notifications can be output via a screen, speaker, and/or other output device at client device 101A. Network communication module 108 can be omitted.

In one embodiment, the system can be implemented as software written in any suitable computer programming language, whether in a standalone or client/server architecture. Alternatively, it may be implemented and/or embedded in hardware.

Method

Figure 3:
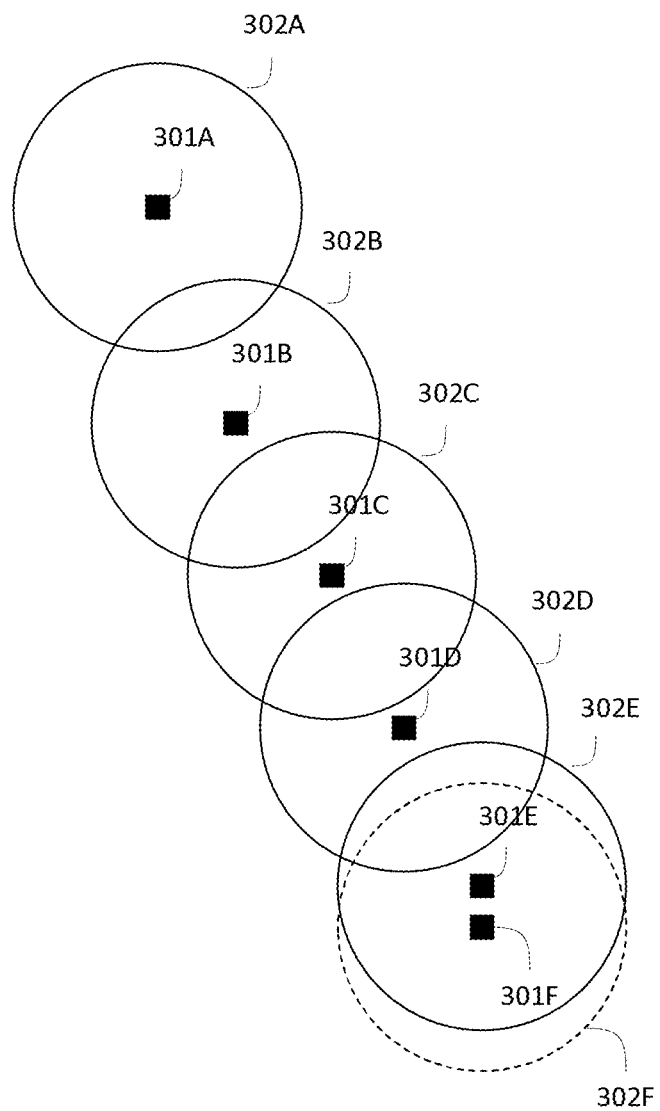
FIG. 3 is a diagram depicting a series of defined geofences that are used for determining whether a device (and its holder) has arrived at a destination, according to one embodiment.
Figure 4:
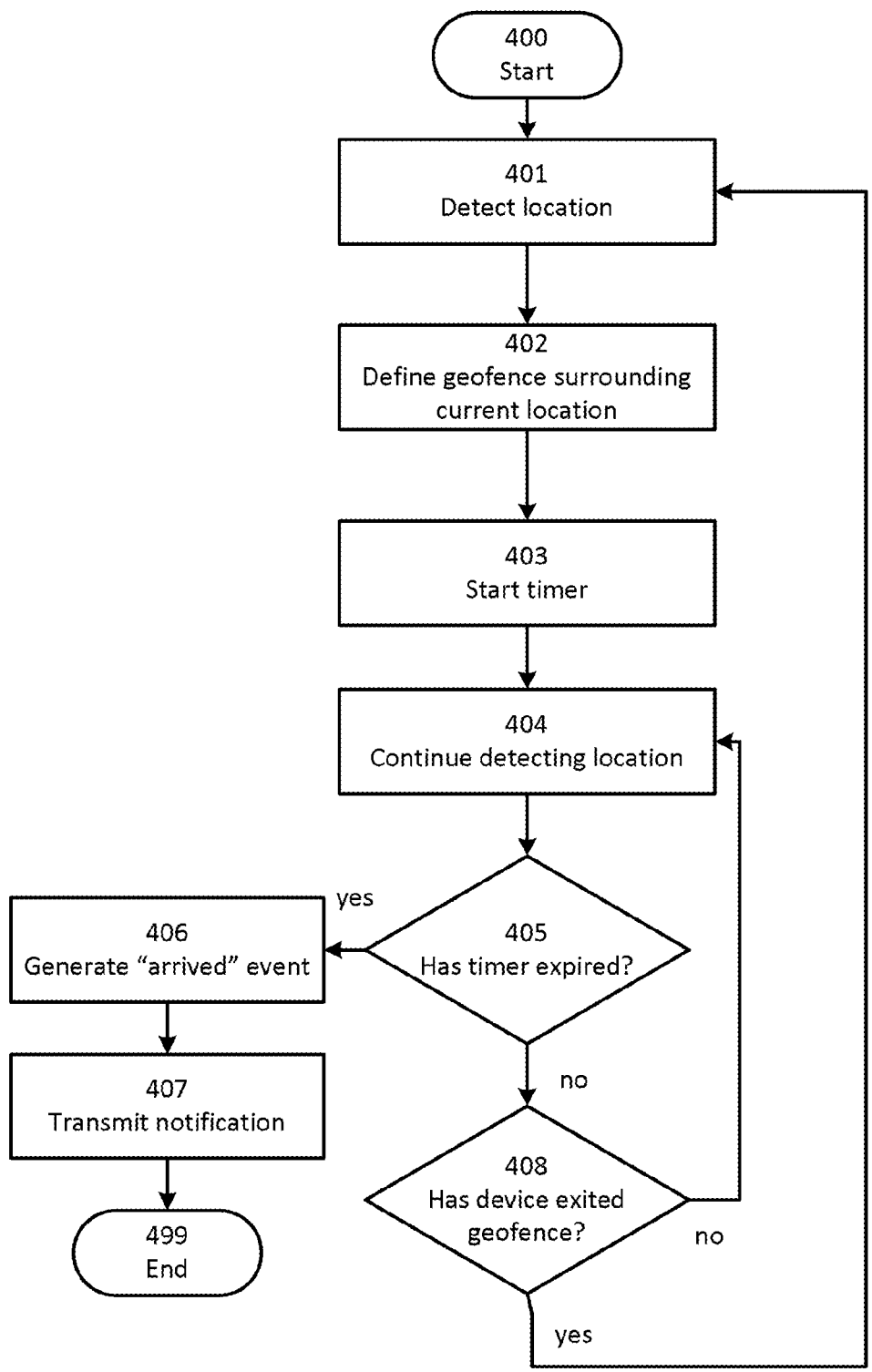
FIG. 4 is a flow diagram depicting a method for detecting arrival at a destination according to one embodiment of the present invention.

Referring now to FIG. 4, there is shown a flow diagram depicting a method for detecting arrival at a destination according to one embodiment of the present invention. Referring also to FIG. 3, there is shown a diagram depicting a series of defined geofences 302A through 302F that are used for determining whether a device 101A (and its holder 100) has arrived at a destination, according to one embodiment. In the following description, the diagram of FIG. 3 will be used to illustrate the method of FIG. 4 by example.

In at least one embodiment, the steps of the method are performed by device 101A in an architecture such as that depicted in FIG. 1A. In an alternative embodiment, as depicted in FIG. 1B, device 101A can transmit location information to server 110, and some of the steps can be performed by server 110. Other arrangements are possible.

The method begins 400. Device 101A begins detecting 401 its location. In at least one embodiment, this step is performed automatically when device 101A is activated, or when an application ("app") is first opened, or upon receipt of a command from device holder 100 or subscriber 114, or upon some other trigger event. Location detection 401 can be performed continuously or periodically. In at least one embodiment, location detection 401 is performed by GPS module 107 in communication with GPS satellites, and/or by other components that can ascertain the current location of device 101A, for example by cell phone tower triangulation and/or by other means. A combination of location detection mechanisms can be used, if desired.

Device 101A then defines 402 a geofence 302 around its current location, and starts 403 countdown timer 109 at some predefined time period, such as for example four minutes. In at least one embodiment, geofence 302 is a circle of predefined radius around the current location of device 101A (or of device holder 100), although geofence 302 can be defined to be another, non-circular shape if desired. The particular size of geofence 302 and the predefined time period for timer 109 can be based on user configuration, such as specified by subscriber 114 or device holder 100, or by some other individual; alternatively, the size of geofence 302 and the predefined time period for timer 109 can be determined automatically. Any of a number of factors can be considered in determining the size and shape of geofence 302 and the predefined time period for timer 109, such as for example and without limitation: the transportation mode (e.g. walking, driving, public transportation, or the like); the terrain; the degree of specificity desired in arrival notifications; and/or any other factors. In at least one embodiment, the size of geofence 302 and/or the predefined time period for timer 109 can be variable.

In at least one embodiment, device 101A performs the steps of determining 402 geofence 302 and starting 403 timer 109; in another embodiment, location information is transmitted to server 110, and server 110 performs the steps of determining geofence 302 and starting 403 timer 109 based on the current location of device 101A or of device holder 100.

Referring also to FIG. 3, location 301A is an example of an initial location of device 101A. Geofence 302A has been defined in the form of a circle surrounding location 301A.

Device 101A continues 404 detecting 404 its location. Device 101A may move within geofence 302 or may exit geofence 302. Device 101A (or server 110) determines 405 whether timer 109 has expired before device 101A exits geofence 302. In at least one embodiment, step 405 is performed by determining whether countdown timer 109 has reached zero. In another embodiment, timer 109 is an elapsed-time counter that counts upwards from zero, and step 405 is performed by determining whether timer 109 has reached a predetermined time limit. Either of these approaches results in a determination as to whether device 101A has remained within geofence 302 for at least a specified period of time. If it is determined that device 101A has remained within geofence 302 for at least the specified period of time, device 101A generates 406 an "arrived" event. Device 101A transmits 407 notification 115 of arrival to server 110, so that server 110 can transmit such notification 115 to device(s) 101B associated with subscriber(s) 114. Optionally, device 101A can also issue output (such as an on-screen alert, sound, vibration, or the like) to indicate arrival.

If, in step 405, timer 109 has not yet expired, device 101A (or server 110) determines 408 whether device 101A has exited geofence 302. If not, the method returns to step 404, wherein device 101A continues to detect 404 its location. Alternatively, an app running on device 101A can rely on an operating system component of device 101A to issue an event indicating that device 101A has moved out of geofence 302.

If, in step 408, it is determined that device 101A has exited geofence 302, the method returns to step 401. The current location of device 101A is detected 401; based on this current location, a new geofence is defined 402, timer 109 is restarted 403, and the method proceeds to step 404, as described above.

Referring again to FIG. 3, location 301B is an example of a new location of device 101A that is detected in step 401 after a determination that device 101A has exited initial geofence 302A before timer 109 has expired. New geofence 302B has been defined in the form of a circle surrounding location 301B. Locations 301C through 301E are successive locations of device 101A that are detected in repetitions of step 401, each being detected after a determination that device 101A has exited a previously defined geofence 302 before timer 109 has expired.

After geofence 302E is defined and timer 109 is reset, location 301F is detected. Since location 301F is detected before timer 109 expires, and location 301F is within geofence 302E, device 101A (or server 110) determines that an "arrived" event has taken place; device 101A is considered to have arrived at a destination. Accordingly, a notification 115 is transmitted 407. Notification 115 can be transmitted 407 to server 110 which then transmits notification 115 to client device(s) 101B associated with subscriber(s) 114. If desired, device 101A can also issue output to indicate that the "arrived" event has taken place. The notification 115 and/or output can indicate the current location of device 101A, the time at which the "arrived" event took place, and/or any other relevant information. For example, notification 115 and/or output can indicate proximity to some known object, address, building, landmark, or the like. Thus, for example, notification 115 may indicate that device holder 100 has arrived at school, or at his or her friend's house, based on proximity of the arrival location to such a known landmark.

Figure 6A:
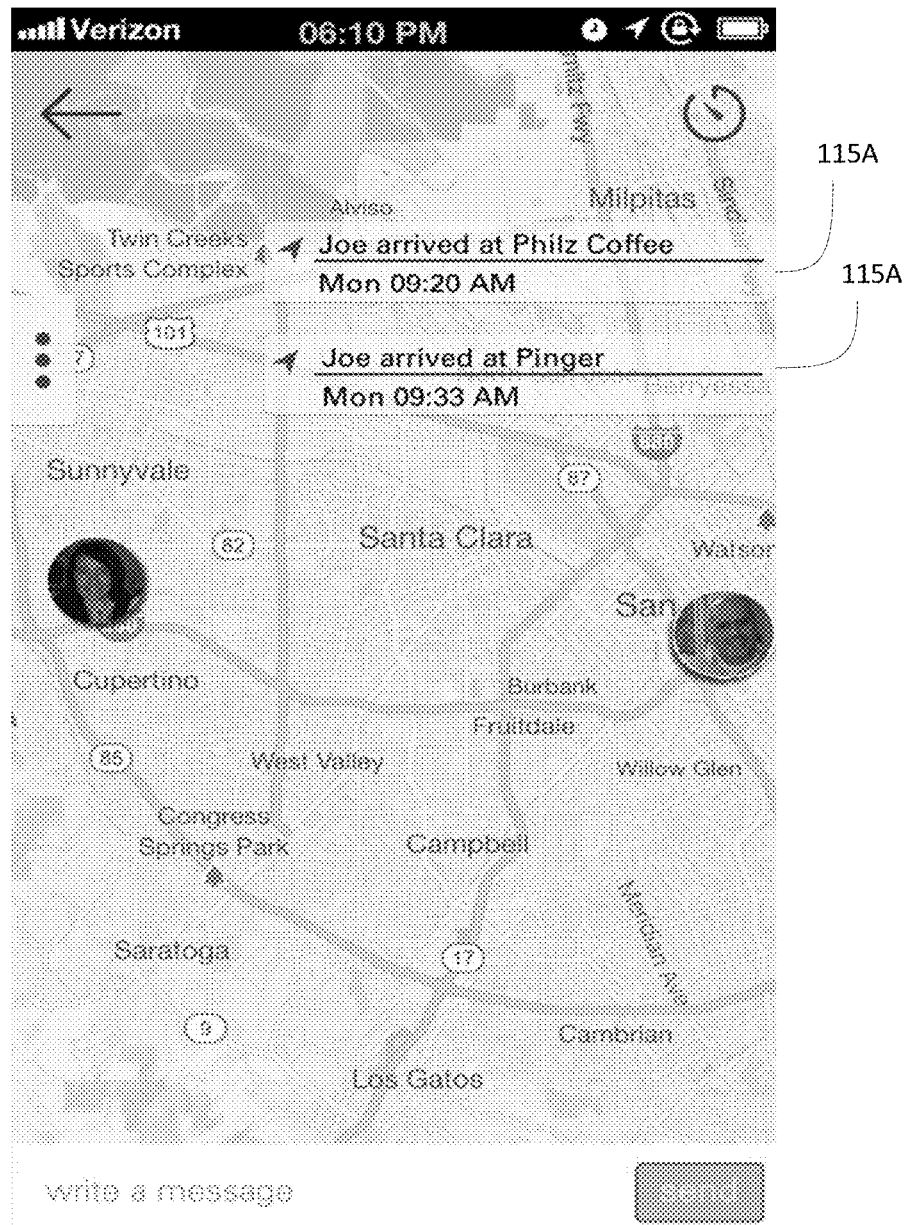
FIG. 6A is a screen shot depicting an example of map-based arrival notifications, according to one embodiment of the present invention.
Figure 6B:
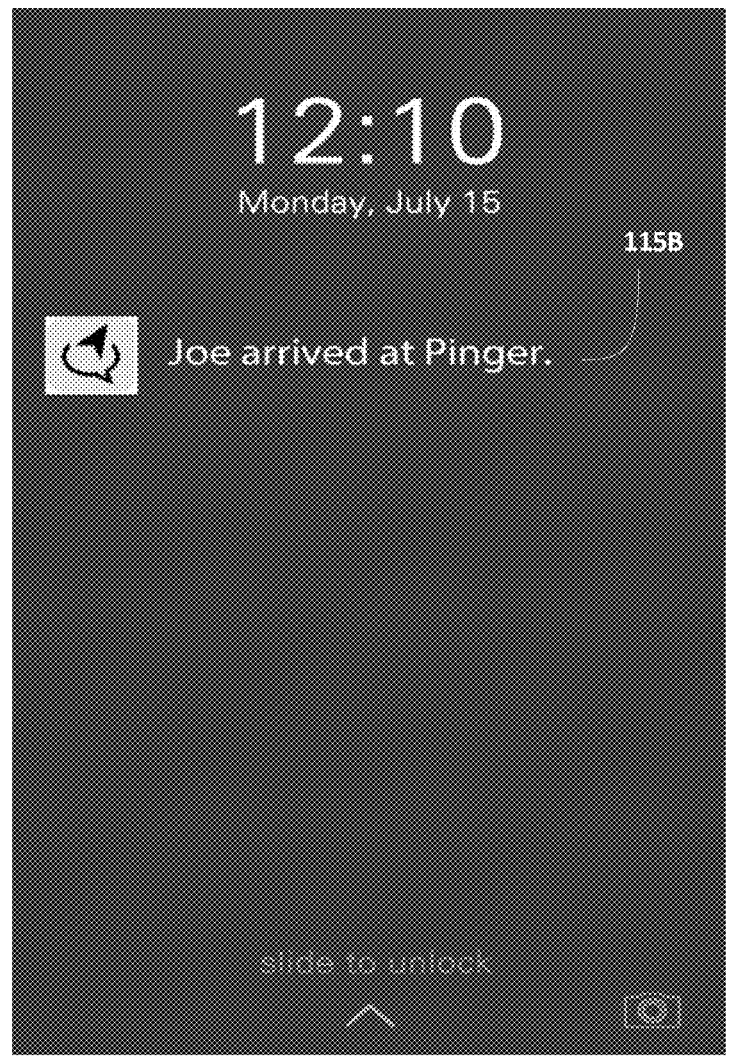
FIG. 6B is a screen shot depicting an example of a text-based arrival notification, according to one embodiment of the present invention.

Notification 115 and/or output can be output at device 101E using any suitable means. FIG. 6A is a screen shot depicting an example of map-based arrival notifications 115A as they may be output at either or both of devices 101A, 101B, according to one embodiment of the present invention. As can be seen in the example, map-based arrival notifications 115A can be overlaid on a map of the area surrounding the arrival location. FIG. 6B is a screen shot depicting an example of a text-based arrival notification 115B as it may be output at either or both of devices 101A, 101B, according to one embodiment of the present invention.

Upon determination that an "arrived" event has taken place, geofence 302F surrounding location 301F is not needed, and is not necessarily defined; it is shown in FIG. 3 for illustrative purposes only.

In at least one embodiment, the system and method of the present invention take into account circumstances and/or environmental conditions which may cause device 101A to remain within geofence 302 even though it has not yet arrived at a destination. A primary goal of the present invention is to determine when device holder 100 has arrived at a destination; pauses along the journey to the destination should preferably not be misinterpreted as arrival events. Accordingly, in at least one embodiment, any available information that indicates the possibility of such a false positive can be taken into account in determining whether an "arrived" event should be generated. For example, traffic information surrounding device's 101A location can be retrieved and analyzed; if it is determined that device 101A might be remaining within geofence 302 because of current traffic conditions, then the system and method of the present invention can make an exception and not generate the "arrived" event. Such exceptions may be implemented, for example, by extending the timer based on current traffic conditions and/or based on other possible reasons why device 101A might be delayed en route. Alternatively, such exceptions may be implemented, for example, by adjusting the sizes of geofences 302 based on current traffic conditions, weather conditions, flight delays, train delays, and/or any other possible reasons why device 101A might be delayed en route. The system and method of the present invention can take into account any relevant circumstance or environmental condition that might affect movement of device 101A, whether or not such condition is specific to the current location of device 101A.

Similarly, it is desirable that "arrived" events not be generated when device holder 100 pauses along the route for other reasons, such as to get gasoline or visit an ATM or restroom, or the like. In at least one embodiment, locations of known waypoints (such as ATM locations, gas stations, and the like) can be stored and taken into account. If timer expires in step 405, the system and method first checks whether the current location corresponds to a location of a known waypoint, making it likely that this is not the final destination; thus, in such a situation, no "arrived" event is generated. In at least one embodiment, a "waypoint" event can be generated, for example to inform subscriber 114 that device holder 100 has stopped at a waypoint. Any suitable data source for known locations can be used for checking for likely waypoints. Such data source may be public (such as locations of known businesses, schools, areas, and/or the like) and/or private (such as geographic information about contacts associated with device holder 100 and stored on device 101A).

In one embodiment, some quantity of additional time, such as an additional ten minutes or the like, is added to timer 109 if geofence 302 surrounding the current location is determined to include a known waypoint, or if device's 101A current location corresponds to a known waypoint. Thus, in such an embodiment, a shorter pause at a waypoint would not generate an "arrived" event, but a lengthier stay at such a location (exceeding the additional time period) would generate an "arrived" event.

In at least one embodiment, the system and method of the present invention can learn from previous behavior. For example, if it is detected or known that a particular device holder 100 frequently or habitually stops at a particular waypoint on the way to a destination, such information can be stored, so that stops at that location do not result in "arrived" events. In such a situation, if timer expires in step 405, the system and method first checks whether the current location corresponds to a stored location, and does not generate an "arrived" event. Device holders 100 and/or other users can be given the opportunity to store, edit, delete, and/or otherwise manage such waypoint information. In addition or alternatively, the system and method can observe device holder 100 behavior over time and make assumptions as to waypoints based on such behavior.

Any other circumstances can be taken into account in determining the size of geofences 302 and/or duration of timer 109. For example, if it is known that device holder 100 is in a campus environment having multiple buildings, geofences 302 can be defined at a larger size to account for the possibility that device holder 100 is merely moving from one building to another, so that no "arrived" events should be generated. In at least one embodiment, device holder, subscriber 114, and/or any other authorized user can adjust geofence 302 sizes and/or timer 109 durations, for example via a preferences screen.

In this manner, the system and method of the present invention are able to take into account circumstances that might otherwise cause false positives to be generated. By limiting such false positives, the system and method of the present invention improve reliability.

Figure 5:
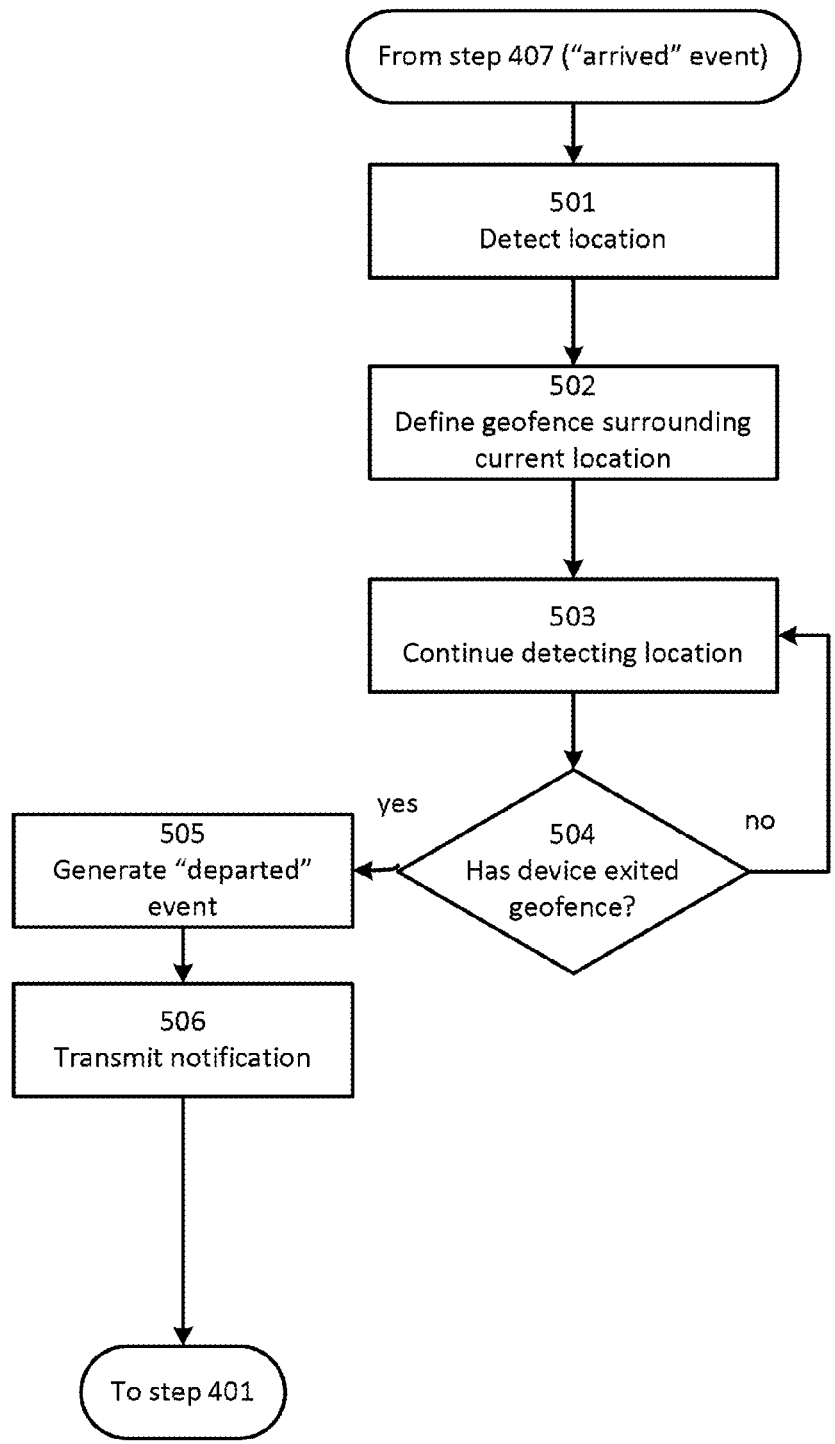
FIG. 5 is a flow diagram depicting a method for detecting departure from a location according to one embodiment of the present invention.

Referring now to FIG. 5, there is shown a flow diagram depicting a method for detecting departure from a location according to one embodiment of the present invention. The method of FIG. 5 may be performed by device 101A (or server 110), for example, after an "arrived" event has been generated and transmitted in steps 406 and 407 of FIG. 4. The location of device 101A is detected, and a new geofence 302 is defined 502 around the current location. This geofence 302 may be the same size and shape as geofences 302 defined above in connection with FIG. 4, or it may be a different size and/or shape. For example, the geofence 302 for FIG. 5 may be a larger size so as to avoid false determinations that device 101A has departed when it has merely moved to different part of the same location.

Device 101A may then move. Device 101A (or server 110) continues 503 to detect the location of device 101A.

In step 504, if device 101A has not exited geofence 302, the method returns to step 503. In step 504, if device 101A has exited geofence 302, then a "departed" event is generated 505. Accordingly, a notification is transmitted 407. The notification can be transmitted 506 to server 110 which then transmits the notification to client device(s) 101B associated with subscriber(s) 114. If desired, device 101A can also issue output to indicate that the "departed" event has taken place. The notification and/or output can indicate the current location of device 101A, the time at which the "departed" event took place, and/or any other relevant information. In at least one embodiment, depart notifications are displayed on device 101A and/or device 101E using a format and appearance similar to that of arrival notifications 115A and/or 115B as described in connection with FIGS. 6A and 6B.

Once the "departed" event is generated 505 and transmitted 506, the method may return to step 401 of FIG. 4 to determine when device 101A arrives at a destination.

Monitoring for departure from a location, as depicted in FIG. 5, can continue for any suitable length of time after arrival at the location. For example, device holder 100 may arrive at a location and then remain there for many hours, or even days, before departing. In such a situation, it may be appropriate that the monitoring of FIG. 5 (steps 503 and 504) may continue for the entire length of time that device holder 100 remains at the location. In at least one embodiment, then, the system and method of the present invention continue to monitor for departure until device holder 100 indicates that monitoring should stop, or elects to stop sharing his or her location. In another embodiment, monitoring for departure may stop automatically after some predetermined period of time.

In at least one embodiment, the system and method of the present invention employ one or more techniques for saving battery power (and/or other resources) by limiting the usage of GPS components. For example, in at least one embodiment, the system and method use fine-grained location determination when performing actions such as defining a geofence (steps 402 and/or 502) and/or determining and sharing the device's 101A location for purposes of generating an "arrived" event (step 406) or generating a "departed" event (step 505). However, for other operations, such as monitoring or determining when device 101A has exited a geofence 302 (steps 408 and/or 504), a relatively coarse-grained location determination can be used, which may consume less power or other resources.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for automatically determining arrival of a mobile communications device at a non-predefined destination, comprising:
    repeatedly performing the steps of:
        a) at a processor, automatically determining a current location of the mobile communications device;
        b) at the processor, automatically defining a geofence comprising a perimeter surrounding the determined current location of the mobile communications device; and
        c) at the processor, automatically initiating a countdown timer for the defined geofence, based on a predefined time period;
    at the processor, automatically determining whether any of the countdown timers has reached zero prior to the mobile communications device exiting the corresponding geofence; and
    at the processor, responsive to any of the countdown timers reaching zero prior to the mobile communications device exiting the corresponding geofence:
        automatically generating an event indicating arrival of the mobile communications device at a destination; and
        at an output device, automatically outputting a notification of the event indicating arrival of the mobile communications device at the destination;
    wherein:
    repeatedly performing steps a) through c) comprises, responsive to the mobile communications device exiting one of the defined geofences prior to the corresponding countdown timer reaching zero, repeating steps a) through c).

2. The method of claim 1, further comprising automatically transmitting, to at least one subscriber, a notification of the event indicating arrival of the mobile communications device at a destination.

3. The method of claim 2, wherein automatically transmitting a notification of the event indicating arrival of the mobile communications device comprises automatically transmitting, to the at least one subscriber, at least one of a current location of the mobile communications device and a time of arrival.

4. The method of claim 2, wherein automatically transmitting a notification of the event indicating arrival of the mobile communications device comprises automatically transmitting the notification to at least one remotely located subscriber over a wireless communication network.

5. The method of claim 1, wherein the mobile communications device is carried by a human user.

6. The method of claim 1, wherein the mobile communications device is affixed to at least one of an item, a package, a cargo item, a vehicle, and a shipping container.

7. The method of claim 1, wherein the predefined time period is user-configurable, the method further comprising:
    receiving user input to specify the predefined time period;
    and wherein automatically initiating a countdown timer for a defined geofence comprises automatically initiating a countdown timer according to the user-specified time period.

8. The method of claim 1, wherein automatically defining a geofence comprises automatically defining a circular region of predefined radius, having the determined current location of the mobile communications device at its center.

9. The method of claim 1, further comprising, subsequent to automatically generating an event indicating arrival of the mobile communications device at a destination:
    at the processor, automatically determining a current location of the mobile communications device;
    at the processor, automatically defining a geofence comprising a perimeter surrounding the determined location of the mobile communications device;
    at the processor, determining whether the mobile communications device has exited the defined geofence; and
    at the processor, responsive to the mobile communications device exiting the defined geofence, generating an event indicating departure of the mobile communications device from the destination.

10. The method of claim 1, wherein the geofence size is user-configurable, the method further comprising:
    receiving user input to specify the geofence size;
    and wherein automatically defining a geofence comprising a perimeter surrounding the determined current location of the mobile communications device comprises defining the geofence according to the user-specified size.

11. A computer-implemented method for automatically determining arrival of a mobile communications device at a non-predefined destination, comprising:
    repeatedly performing the steps of:
        a) at a processor, automatically determining a current location of the mobile communications device;
        b) at the processor, automatically defining a geofence comprising a perimeter surrounding the determined current location of the mobile communications device; and
        c) at the processor, automatically initiating an elapsed-time timer for the defined geofence;

at the processor, automatically determining whether any of the elapsed-time timers has reached a predefined time period prior to the mobile communications device exiting the corresponding geofence; and at the processor, responsive to any of the elapsed-time timers reaching the predefined time period prior to the mobile communications device exiting the corresponding geofence:

automatically generating an event indicating arrival of the mobile communications device at a destination; and at an output device, automatically outputting a notification of the event indicating arrival of the mobile communications device at the destination;

wherein:

repeatedly performing steps a) through c) comprises, responsive to the mobile communications device exiting one of the defined geofences prior to the corresponding elapsed-time timer reaching the predefined time period, repeating steps a) through c).

12. The method of claim 11, further comprising automatically transmitting, to at least one subscriber, a notification of the event indicating arrival of the mobile communications device at a destination.

13. The method of claim 11, further comprising, subsequent to automatically generating an event indicating arrival of the mobile communications device at a destination:

at the processor, automatically determining a current location of the mobile communications device;

at the processor, automatically defining a geofence comprising a perimeter surrounding the determined location of the mobile communications device;

at the processor, determining whether the mobile communications device has exited the defined geofence; and at the processor, responsive to the mobile communications device exiting the defined geofence, generating an event indicating departure of the mobile communications device from the destination.

14. A computer program product for automatically determining arrival of a mobile communications device at a non-predefined destination, comprising:

a non-transitory storage medium; and computer program code, encoded on the medium, configured to cause at least one processor to repeatedly perform the steps of:

a) automatically determining a current location of the mobile communications device;

b) automatically defining a geofence comprising a perimeter surrounding the determined current location of the mobile communications device; and c) automatically initiating a countdown timer for the defined geofence, based on a predefined time period;

computer program code, encoded on the medium, configured to cause at least one processor to perform the steps of:

automatically determining whether any of the countdown timers has reached zero prior to the mobile communications device exiting the corresponding geofence; and responsive to any of the countdown timers reaching zero prior to the mobile communications device exiting the corresponding geofence:

automatically generating an event indicating arrival of the mobile communications device at a destination; and causing an output device to automatically output a notification of the event indicating arrival of the mobile communications device at the destination;

wherein:

repeatedly performing steps a) through c) comprises, responsive to the mobile communications device exiting one of the defined geofences prior to the corresponding countdown timer reaching zero, repeating steps a) through c).

15. The computer program product of claim 14, further comprising computer program code configured to cause at least one processor to automatically transmit, to at least one subscriber, a notification of the event indicating arrival of the mobile communications device at a destination.

16. The computer program product of claim 15, wherein the computer program code configured to cause at least one processor to automatically transmit a notification of the event indicating arrival of the mobile communications device comprises computer program code configured to cause at least one processor to automatically transmit, to the at least one subscriber, at least one of a current location of the mobile communications device and a time of arrival.

17. The computer program product of claim 15, wherein the computer program code configured to cause at least one processor to automatically transmit a notification of the event indicating arrival of the mobile communications device comprises computer program code configured to cause at least one processor to automatically transmit the notification to at least one remotely located subscriber over a wireless communication network.

18. The computer program product of claim 14, wherein the mobile communications device is carried by a human user.

19. The computer program product of claim 14, wherein the mobile communications device is affixed to at least one of an item, a package, a cargo item, a vehicle, and a shipping container.

20. The computer program product of claim 14, wherein the computer program code configured to cause at least one processor to automatically define a geofence comprises computer program code configured to cause at least one processor to automatically define a circular region of predefined radius, having the determined current location of the mobile communications device at its center.

21. The computer program product of claim 14, further comprising computer program code configured to cause at least one processor to, subsequent to automatically generating an event indicating arrival of the mobile communications device at a destination, perform the steps of:

automatically determining a current location of the mobile communications device;

automatically defining a geofence comprising a perimeter surrounding the determined location of the mobile communications device;

determining whether the mobile communications device has exited the defined geofence; and responsive to the mobile communications device exiting the defined geofence, generating an event indicating departure of the mobile communications device from the destination.

22. The computer program product of claim 14, wherein the geofence size is user-configurable, the computer program product further comprising computer program code, encoded on the medium, configured to cause at least one processor to perform the step of:

causing a user input device to receive user input specifying the geofence size;

and wherein automatically defining a geofence comprising a perimeter surrounding the determined current location of the mobile communications device comprises defining the geofence according to the user-specified size.

23. A system, comprising:
a location determination module;
at least one countdown timer;
at least one processor, communicatively coupled to the location determination module and to the timer, configured to repeatedly perform the steps of:
  a) causing the location determination module to automatically determine a current location of a mobile communications device;
  b) automatically defining a geofence comprising a perimeter surrounding the determined current location of the mobile communications device; and
  c) automatically initiating a countdown timer for the defined geofence, based on a predefined time period; and
an output device, communicatively coupled to the at least one processor;
wherein the at least one processor is further configured to perform the steps of:
determining whether any of the countdown timers has reached zero prior to the mobile communications device exiting the corresponding geofence; and
responsive to any of the countdown timers reaching zero prior to the mobile communications device exiting the corresponding geofence:
  automatically generating an event indicating arrival of the mobile communications device at a destination; and
  causing the output device to automatically output a notification of the event indicating arrival of the mobile communications device at the destination;
wherein:
repeatedly performing steps a) through c) comprises, responsive to the mobile communications device exiting one of the defined geofences prior to the corresponding countdown timer reaching zero, repeating steps a) through c).

24. The system of claim 23, further comprising a network communication module, communicatively coupled to the at least one processor, configured to automatically transmit, to at least one subscriber, a notification of the event indicating arrival of the mobile communications device at a destination.

25. The system of claim 24, wherein the network communication module is configured to automatically transmit the notification of the event indicating arrival of the mobile communications device by automatically transmitting, to the at least one subscriber, at least one of a current location of the mobile communications device and a time of arrival.

26. The system of claim 24, wherein the network communication module is configured to automatically transmit the notification of the event indicating arrival of the mobile communications device by automatically transmitting the notification to at least one remotely located subscriber over a wireless communication network.

27. The system of claim 23, wherein the mobile communications device comprises a mobile communications device.

28. The system of claim 23, wherein the mobile communications device is carried by a human user.

29. The system of claim 23, wherein the mobile communications device is affixed to at least one of an item, a package, a cargo item, a vehicle, and a shipping container.

30. The system of claim 23, wherein the at least one processor is configured to automatically define the geofence by automatically defining a circular region of predefined radius, having the determined current location of the mobile communications device at its center.

31. The system of claim 23, wherein the at least one processor is further configured to, subsequent to automatically generating an event indicating arrival of the mobile communications device at a destination, perform the steps of:
automatically determining a current location of the mobile communications device;
automatically defining a geofence surrounding the determined location of the mobile communications device;
determining whether the mobile communications device has exited the defined geofence; and
responsive to the device exiting the defined geofence, generating an event indicating departure of the mobile communications device from the destination.

32. The system of claim 23, wherein the geofence size is user-configurable, the system further comprising:
a user input device, configured to receive user input to specify the geofence size;
and wherein automatically defining a geofence comprising a perimeter surrounding the determined current location of the mobile communications device comprises defining the geofence according to the user-specified size.

33. A computer program product for automatically determining arrival of a mobile communications device at a non-predefined destination, comprising:
a non-transitory storage medium; and
computer program code, encoded on the medium, configured to cause at least one processor to repeatedly perform the steps of:
  a) automatically determining a current location of the mobile communications device;
  b) automatically defining a geofence comprising a perimeter surrounding the determined current location of the mobile communications device; and
  c) automatically initiating an elapsed-time timer for the defined geofence;
computer program code, encoded on the medium, configured to cause at least one processor to perform the steps of:
automatically determining whether any of the elapsed-time timers has reached a predefined time period prior to the mobile communications device exiting the corresponding geofence; and
responsive to any of the elapsed-time timers reaching the predefined time period prior to the mobile communications device exiting the corresponding geofence:
  automatically generating an event indicating arrival of the mobile communications device at a destination; and
  causing an output device to automatically output a notification of the event indicating arrival of the mobile communications device at the destination;
wherein:
repeatedly performing steps a) through c) comprises, responsive to the mobile communications device exiting one of the defined geofences prior to the corresponding elapsed-time timer reaching the predefined time period, repeating steps a) through c).

34. The computer program product of claim 33, further comprising computer program code configured to cause at least one processor to automatically transmit, to at least one subscriber, a notification of the event indicating arrival of the mobile communications device at a destination.

35. The computer program product of claim 33, further comprising computer program code configured to cause at least one processor to, subsequent to automatically generating an event indicating arrival of the mobile communications device at a destination, perform the steps of:
   automatically determining a current location of the mobile communications device;
   automatically defining a geofence comprising a perimeter surrounding the determined location of the mobile communications device;
   determining whether the mobile communications device has exited the defined geofence; and
   responsive to the mobile communications device exiting the defined geofence, generating an event indicating departure of the mobile communications device from the destination.

36. A system, comprising:
   a location determination module;
   at least one countdown timer;
   at least one processor, communicatively coupled to the location determination module and to the timer, configured to repeatedly perform the steps of:
      a) causing the location determination module to automatically determine a current location of a mobile communications device;
      b) automatically defining a geofence comprising a perimeter surrounding the determined current location of the mobile communications device; and
      c) automatically initiating an elapsed-time timer for the defined geofence; and
   an output device, communicatively coupled to the at least one processor;
   wherein the at least one processor is further configured to perform the steps of:
      determining whether any of the elapsed-time timers has reached a predefined time period prior to the mobile communications device exiting the corresponding geofence; and
      responsive to any of the elapsed-time timers reaching the predefined time period prior to the mobile communications device exiting the corresponding geofence:
         automatically generating an event indicating arrival of the mobile communications device at a destination; and
         causing the output device to automatically output a notification of the event indicating arrival of the mobile communications device at the destination;
   wherein:
   repeatedly performing steps a) through c) comprises, responsive to the mobile communications device exiting one of the defined geofences prior to the corresponding elapsed-time timer reaching the predefined time period, repeating steps a) through c).

37. The system of claim 36, further comprising a network communication module, communicatively coupled to the at least one processor, configured to automatically transmit, to at least one subscriber, a notification of the event indicating arrival of the mobile communications device at a destination.

38. The system of claim 36, wherein the at least one processor is further configured to, subsequent to automatically generating an event indicating arrival of the mobile communications device at a destination, perform the steps of:
   automatically determining a current location of the mobile communications device;
   automatically defining a geofence surrounding the determined location of the mobile communications device;
   determining whether the mobile communications device has exited the defined geofence; and
   responsive to the device exiting the defined geofence, generating an event indicating departure of the mobile communications device from the destination.

* * * * *